United States Patent Office 3,163,610
Patented Dec. 29, 1964

3,163,610
RARE EARTH ACTIVATED ALKALINE EARTH HALOFLUORIDE LUMINESCENT MATERIALS
Perry N. Yocom, Princeton, N.J., assignor to Radio Corporation of America, a corporation of Delaware
No Drawing. Filed Mar. 26, 1962, Ser. No. 182,672
9 Claims. (Cl. 252—301.4)

This invention relates to novel luminescent materials which are particularly, but not necessarily exclusively, useful as laser materials.

Laser materials and systems are described by Vogel et al. in Electronics, October 27, 1961, pages 40 to 47. The word "laser" is a short form for "light amplification by stimulated emission of radiation." Laser materials are luminescent materials which exhibit stimulated emission of radiation under a particular set of conditions. When a material exhibits a stimulated emission of radiation, it is said to lase. A laser material is usually a single crystal body comprised of a matrix material having impurity ions or dopants contained therein. The desirable charactersteristics of a laser material result from the combination of matrix material, dopant, and crystallinity of the material.

An object of this invention is to provide novel luminescent materials.

A further object is to provide novel laser materials.

In general, the luminescent materials of the invention have a tetragonal crystal structure and the molar composition:

$$AHaF:yM$$

where:

$A$ is at least one of Ba, Ca, and Sr
$Ha$ is at least one of Cl, Br, and I
$F$ is fluorine
$M$ is at least one of $Sm^{+2}$, $Tm^{+2}$ and $U^{+3}$
$y$ is between about $10^{-6}$ and $10^{-1}$ mol.

When excited with suitable radiant energy, the foregoing materials luminesce, emitting radiation in relatively narrow bands, generally in the red and infrared regions of the spectrum. This luminescence occurs with the material at room temperature and at liquid nitrogen temperatures. The wavelength ranges of emitted radiation is related to the dopant. For divalent samarium $Sm^{+2}$, the range is about 5500 to 8500 A. For trivalent uranium $U^{+3}$, the range is about 8000 to 25000 A. For divalent thulium $Tm^{+2}$, the range is about 10,000 to 12,000 A. Generally, the emission bands are shifted toward the shorter wavelengths when higher molecular weight A and Ha are selected. When the materials of the invention are prepared in single crystal form with high purity and crystallinity, at least some of the crystals can be made to lase with radiant excitation.

The following are some typical luminescent compositions of the invention:

CaClF:0.001$Sm^{+2}$:0.001$Tm^{+2}$
CaClF:0.05$Sm^{+2}$
CaClF:0.00005$Sm^{+2}$
$(Ca_{0.5}Sr_{0.5})$ClF:0.005:$Sm^{+2}$
$(Ca_{0.5}Sr_{0.5})(Cl_{0.5}Br_{0.5})$F:0.01$Sm^{+2}$
SrClF:0.001$Sm^{+2}$
SrClF:0.1$Sm^{+2}$
SrClF:0.0002$Sm^{+2}$
SrClF:0.000001$Sm^{+2}$
SrIF:0.004$Sm^{+2}$
BaBrF:0.001$U^{+3}$
BaBrF:0.05$U^{+3}$
BaBrF:0.00006$U^{+3}$
BaClF:0.001$Sm^{+2}$
BaClF:0.1$Sm^{+2}$
BaClF:0.00007$Sm^{+2}$
BaBrF:0.001$Tm^{+2}$
BaBrF:0.1$Tm^{+2}$
BaBrF:0.000001$Tm^{+2}$
$(Ba_{0.5}Sr_{0.5})$BrF:0.02$Tm^{+2}$

The luminescent materials of the invention may be prepared by fusing together pure anhydrous constituent halides in atmospheres which are conducive to developing the desired valency in the dopant. Typically, one mol anhydrous $AHa_2$, one mol anhydrous $AF_2$, and the desired mol proportion of MHa or MF are fused together in a reducing atmosphere, such as hydrogen; or a neutral atmosphere, such as nitrogen, argon, or neon, or combinations thereof. The dopant may be introduced as an oxide of M provided the atmosphere contains also the corresponding hydrogen halide. The melt is then solidified by cooling to room temperature in the atmosphere. The $AHa_2$ and the $AF_2$ may be combinations of two or more different halides.

The $AHa_2$, $AF_2$, $MHa$, and $MF$ are preferably substantially free of carbonaceous material, free water, and chemically-combined water. Some reagent grade raw materials satisfy these requirements and some do not. Suitable $CaCl_2$ may be prepared from unsuitable reagent grade $CaCl_2$ as follows: Hydrated $CaCl_2$ is dried at 200° C. in air, then is melted under a dry HCl atmosphere, and then is cooled. The solidified melt is dissolved in water and filtered. The filtrate is evaporated and the remaining solids are dried in air at 200° C. The dry solids are remelted under a dry HCl atmosphere, and the melt solidified to produce the purified raw material. $BaCl_2$ and $SrCl_2$ may be prepared by the same technique. $CaBr_2$, $CaI_2$, $BaBr_2$, $BaI_2$, $SrBr_2$, and $SrI_2$ may be prepared by the same technique except that HBr or HI atmospheres are substituted for HCl when preparing the bromides and iodides respectively. Direct combination of the metal and halogen can also be used as a means of preparation.

*Example 1.*—Mix 1.0 x $10^{-3}$ mol $Sm_2O_3$ with one mol pure anhydrous $CaCl_2$. Melt the mixture in a dry atmosphere containing about equal parts by volume of hydrogen and HCl. The proportions in parts by volume of $H_2$/HCl may be between 90/10 and 20/80. Solidify the melt and add one mol pure anhydrous $CaF_2$. Melt the mixture in an atmosphere of dry hydrogen and then solidify to form a luminescent material having a tetragonal crystal structure and the formula $$CaClF:0.001Sm^{+2}$$

With visible or ultraviolet excitation, the material luminesces at wavelengths of about 6945 A., 7075 A., and 7355 A.

*Example 2.*—To prepare SrClF:0.001$Sm^{+2}$ follow the procedure of Example 1 except substitute $SrCl_2$ for $CaCl_2$ and $SrF_2$ for $CaF_2$. With visible or ultraviolet excitation, the material luminesces at wavelengths of 6435 A., 6905 A., and 7310 A.

*Example 3.*—Mix 2.0 x $10^{-3}$ mol $UF_4$ (or $UO_2$) with one mol pure anhydrous $BaCl_2$. Melt the mixture in a dry atmosphere containing about equal parts by volume of hydrogen and HCl and then solidify the melt. To the solidified melt, add one mol pure anyhdrous $BaF_2$. Melt this mixture in an atmosphere of dry hydrogen gas and then solidify the melt to produce a luminescent material having a tetragonal crystal structure and the molar composition BaClF:0.001$U^{+3}$. With infrared, visible, or ultraviolet excitation, the material luminesces at room temperature at wavelengths of about 2.420 micron, 1.410 micron, .870 micron.

*Example 4.*—Mix 0.5 x $10^{-3}$ mol $Tm_2O_3$ with one mol pure anhydrous $BaBr_2$. Melt the mixture in a dry atmosphere containing about equal parts by volume hydrogen and HBr and then solidify the melt by cooling. To the solidified material, add one mol $BaF_2$ and $0.5 \times 10^{-3}$ mol thulium metal powder. Melt this mixture in a dry atmosphere of hydrogen (or helium or argon) and then solidify the melt to produce a luminescent material having a tetragonal crystal structure and the molar composition $BaBrF:0.001Tm^{+2}$. With infrared, visible, or ultraviolet excitation, the material luminesces at room temperature at wavelengths of about 1.151 micron and 1.160 micron.

The luminescent materials of the invention may be prepared as relatively large single crystals with a high degree of crystallinity. This may be achieved by melting the luminescent materials of the invention and growing crystals thereof by the Bridgman technique, either horizontal or vertical. The horizontal Bridgman technique is preferred. In one application of the Bridgman technique, a quantity of material is passed through two zones, one of which is maintained about 20° C. above the melting point of the material and the other of which is maintained at temperature about 20° C. below the melting point of the material. A rate of travel of about one inch per 24 hours has been found to be adequate. Large single crystals may also be grown by the Czochralski method.

What is claimed is:

1. A luminescent material having a tetragonal crystal structure and the molar composition:

$$AHaF:yM$$

where:
A is at least one of the group consisting of Ba, Ca, Sr
Ha is at least one of the group consisting of Cl, Br, I
F is fluorine
M is at least one of the group consisting of $Sm^{+2}$, $Tm^{+2}$ and $U^{+3}$
y is between about $10^{-6}$ and $10^{-1}$ 2. A luminescent material having a tetragonal crystal structure and the molar composition:

$$BaHaF:yM$$

where:
Ha is at least one of the group consisting of Cl, Br, and I
M is at least one of the group consisting of $Sm^{+2}$, $Tm^{+2}$, and $U^{+3}$
y is between about $10^{-6}$ and $10^{-1}$ 3. A luminescent material having a tetragonal crystal structure of the molar composition:

$$CaHaF:yM$$

where:
Ha is at least one of the group consisting of Cl, Br, and I
M is at least one of the group consisting of $Sm^{+2}$, $Tm^{+2}$ and $U^{+3}$
y is between about $10^{-6}$ and $10^{-1}$ 4. A luminescent material having a tetragonal crystal structure and molar composition:

$$SrHaF:yM$$

where:
Ha is at least one of the group consisting of Cl, Br, and I
M is at least one of the group consisting of $Sm^{+2}$, $Tm^{+2}$ and $U^{+3}$
y is between about $10^{-6}$ and $10^{-1}$ 5. A luminescent material having a tetragonal crystal structure and the molar composition:

$$CaClF:ySm^{+2}$$

where:
y is between about $10^{-6}$ and $10^{-1}$

6. A luminescent material having a tetragonal crystal structure and the molar composition:

$$SrClF:ySm^{+2}$$

where:
y is between about $10^{-6}$ and $10^{-1}$

7. A luminescent material having a tetragonal crystal structure and the molar composition:

$$BaClF:yU^{+3}$$

where:
y is between about $10^{-6}$ and $10^{-1}$

8. A luminescent material having a tetragonal crystal structure and the molar composition:

$$BaBrF:yTm^{+2}$$

where:
y is between about $10^{-6}$ and $10^{-1}$

9. A luminescent material having a tetragonal crystal structure and the molar composition:

$$BaClF:ySm^{+2}$$

where:
y is between about $10^{-6}$ and $10^{-1}$

References Cited by the Examiner

UNITED STATES PATENTS 2,303,963 12/42 Uhle _____ 252—301.4
2,409,174 10/46 Dietz _____ 252—301.4

OTHER REFERENCES

Kroger: "Some Aspects of the Luminescence of Solids," Elsevier Pub. Co. Inc., N.Y., 1948, pages 283, 284, 294–296 and 298.

MAURICE A. BRINDISI, *Primary Examiner.*

JULIUS GREENWALD, *Examiner.*